US010551868B2

(12) United States Patent
Chou et al.

(10) Patent No.: US 10,551,868 B2
(45) Date of Patent: Feb. 4, 2020

(54) MULTIPROCESSOR SYSTEMS HAVING PROCESSORS WITH DIFFERENT PROCESSING CAPABILITIES CONNECTING TO A CLOCK GENERATOR

(71) Applicant: MediaTek Inc., Hsinchu (TW)

(72) Inventors: Hung-Lin Chou, Zhubei (TW); Chih-Yung Chiu, Zhubei (TW); Yu-Chung Chang, Zhubei (TW); Chieh-Yuan Hsu, Zhubei (TW)

(73) Assignee: MediaTek, Inc., Hsinchu (TW)

( * ) Notice: Subject to any disclaimer, the term of this patent is extended or adjusted under 35 U.S.C. 154(b) by 153 days.

(21) Appl. No.: 15/440,884

(22) Filed: Feb. 23, 2017

(65) Prior Publication Data

US 2017/0269629 A1    Sep. 21, 2017

Related U.S. Application Data

(60) Provisional application No. 62/366,650, filed on Jul. 26, 2016, provisional application No. 62/308,996, filed on Mar. 16, 2016.

(51) Int. Cl.
*G06F 1/00* (2006.01)
*G06F 1/08* (2006.01)
*G06F 9/50* (2006.01)

(52) U.S. Cl.
CPC .............. *G06F 1/08* (2013.01); *G06F 9/505* (2013.01); *G06F 9/5083* (2013.01); *Y02D 10/122* (2018.01); *Y02D 10/126* (2018.01); *Y02D 10/24* (2018.01)

(58) Field of Classification Search
CPC .......... G06F 1/08; G06F 1/3293; G06F 1/324; G06F 1/3203; G06F 1/329; G06F 9/505; G06F 9/5083; Y02D 10/24; Y02D 10/126; Y02D 10/122
See application file for complete search history.

(56) References Cited

U.S. PATENT DOCUMENTS

| 9,858,115 | B2 | 1/2018 | Chang et al. |
| 2005/0132239 | A1* | 6/2005 | Athas ................ G06F 1/3203 713/300 |
| 2011/0119672 | A1 | 5/2011 | Ramaraju et al. |
| 2012/0198207 | A1 | 8/2012 | George et al. |

(Continued)

OTHER PUBLICATIONS

Alan Tringham, "Software Techniques for ARM big.LITTLE Systems", Oct 17, 2013 (Year: 2013).*

*Primary Examiner* — Xuxing Chen
(74) *Attorney, Agent, or Firm* — Tong J. Lee

(57) ABSTRACT

A multiprocessor system includes a first set of processors and a second set of processors. The first set of processors include a first set of standard cells and is configured to operate in a first frequency range. The second set of processors include a second set of standard cells and is configured to operate in a second frequency range. The first set of processors and the second set of processors have the same register-transfer level (RTL) description. Cells in the first set of standard cells have corresponding cells in the second set of standard cells with different characteristics. The first frequency range includes one or more frequencies higher than a maximum frequency in the second frequency range. The system also includes a clock generator that provides the same frequency to the first set of processors and the second set of processors.

20 Claims, 5 Drawing Sheets

(56) References Cited

U.S. PATENT DOCUMENTS

2014/0173311 A1* 6/2014 Park .................. G06F 1/206
 713/320
2017/0052560 A1* 2/2017 Yang .................. G06F 1/32

* cited by examiner

MULTIPROCESSOR SYSTEMS HAVING PROCESSORS WITH DIFFERENT PROCESSING CAPABILITIES CONNECTING TO A CLOCK GENERATOR

CROSS-REFERENCE TO RELATED APPLICATIONS

This application claims the benefit of U.S. Provisional Application No. 62/308,996 filed on Mar. 16, 2016, and U.S. Provisional Application No. 62/366,650 filed on Jul. 26, 2016.

TECHNICAL FIELD

Embodiments of the invention relate to a multiprocessor system that includes processors of different performance and power consumption characteristics.

BACKGROUND

Some modern multiprocessor systems include more than one type of processors, such as the "Big" (B-type) and "Little" (L-type) multiprocessor systems. The L-type processors are relatively battery-saving and low performance, while the B-type processors are relatively more powerful and power hungry. Typically, the B-type and L-type processors have the same instruction set architecture (ISA), such that the same set of instructions may be executed on both processor types. One advantage of such systems is that the performance requirements of the system workload may be matched up with the processing capabilities of the processors, thereby optimizing power efficiency of the system.

For example, ARM® big.LITTLE™ processing systems are widely adopted in the industry for delivering high performance with power optimization. The big.LITTLE processing system includes B-type processors and L-type processors, both of which implement the same ISA. However, the B-type processors and the L-type processors have different hardware designs in one or more of the following structural aspects: decode width, pipeline depth, execution order (in-order vs. out-of-order), branch prediction, etc.

Some of the big.LITTLE processing systems allow the B-type processors and the L-type processors to operate concurrently at different frequencies. To enable the processors at different frequencies to connect to the memory, an asynchronous bridge (e.g., the ADB-400) is added between each processor and the interconnect that leads to the memory. Adding the asynchronous bridges incur additional hardware cost and latency to the system.

On the other hand, operating a system with the same frequency for all processor types at the same time may compromise the performance of the different processor types. Therefore, there is a need to improve the power and performance management of a multiprocessor system that includes processors of different types or different characteristics.

SUMMARY

In one embodiment, a multiprocessor system is provided for processing a workload. The multiprocessor system comprises: a first set of processors, which include a first set of standard cells and is configured to operate in a first frequency range; a second set of processors, which include a second set of standard cells and is configured to operate in a second frequency range. The first set of processors and the second set of processors have a same register-transfer level (RTL) description. Cells in the first set of standard cells have corresponding cells in the second set of standard cells with different characteristics. Furthermore, the first frequency range includes one or more frequencies higher than a maximum frequency in the second frequency range. The multiprocessor system also includes a clock generator to provide a same frequency to the first set of processors and the second set of processors.

In another embodiment, a method is provided for processing a workload by a multiprocessor system. The method comprises: determining a number of threads in the workload; and enabling one or more processors from a first set of processors and a second set of processors to process the workload at a same frequency based on the number of threads and whether the workload exceeds a threshold. The first set of processors include a first set of standard cells and is configured to operate in a first frequency range. The second set of processors include a second set of standard cells and is configured to operate in a second frequency range. The first set of processors and the second set of processors have a same RTL description. Cells in the first set of standard cells have corresponding cells in the second set of standard cells with different characteristics. Furthermore, the first frequency range includes one or more frequencies higher than a maximum frequency in the second frequency range.

According to embodiments described herein, processors of different power consumption and performance characteristics may operate in the same system at the same frequency. Moreover, thread scheduling and dynamic voltage and frequency scaling (DVFS) may be performed to enhance the performance of the system.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a system and method for a multiprocessor system to process a workload with high performance and power efficiency. The multiprocessor system includes processors of different characteristics in terms of power consumption and performance. It should be noted that the term "multiprocessor system" as used herein is a system that includes multiple processors, and each processor may contain one or more cores. In one embodiment, each processor is equivalent to a central processing unit (CPU). Alternatively, one or more of the processors may be a special-purpose processor. The multiple processors may be arranged and managed as one or more clusters.

Figure 1:
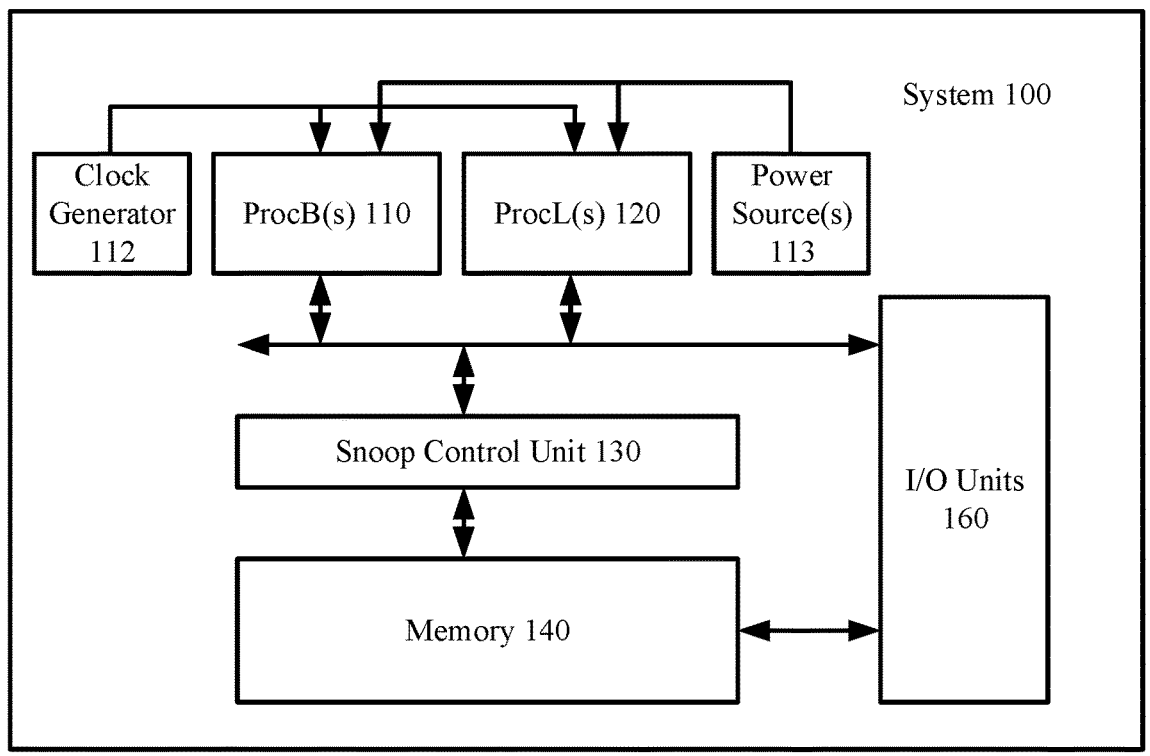
FIG. 1 illustrates a system that includes processors of different power consumption and performance characteristics according to one embodiment.

FIG. 1 illustrates an example of a system 100 according to one embodiment. The system 100 is a multiprocessor system; more specifically, a multiprocessor system that includes processors of different characteristics in terms of power consumption and performance. The illustration of the system 100 has been simplified; it is understood that the system 100 may include many more components that are omitted from FIG. 1 for ease of illustration.

In the embodiment of FIG. 1, the system 100 includes a plurality of processors, including one or more ProcB 110 and one or more ProcL 120. Each ProcB 110 may have higher performance and consume more power than each ProcL 120. Thus, ProcB 110 may serve as a "Big" processor and ProcL 120 may serve as a "Little" processor. Both ProcB 110 and ProcL 120 receive power from one or more power sources 113. Non-limiting examples of the power source 113 include a voltage regulator such as a switching regulator (i.e., a "buck"), or a linear regulator such as a low-dropout (LDO) circuit. In one embodiment, ProcB 110 and ProcL 120 may share the same power source 113 and receive the same voltage. Alternatively, ProcB 110 and ProcL 120 may receive power from independent power sources 113 at different voltage levels. Moreover, each of ProcB 110 and ProcL 120 may operate at the same frequency according to clock signals received from a clock generator 112. It is understood that the system 100 may include any number of ProcBs 110 and any number of ProcLs 120.

The system 100 may also include a snoop control unit 130 or other means for managing cache coherency between the caches maintained at each of the processors 110, 120 and a memory 140 (e.g., dynamic random access memory (DRAM), or other volatile or non-volatile memory). The system 100 may also include a number of I/O units 160 such as display, keyboard, touch screen, touch pad, speakers, microphones, etc., some or all of which may access the memory 140.

Figure 2:
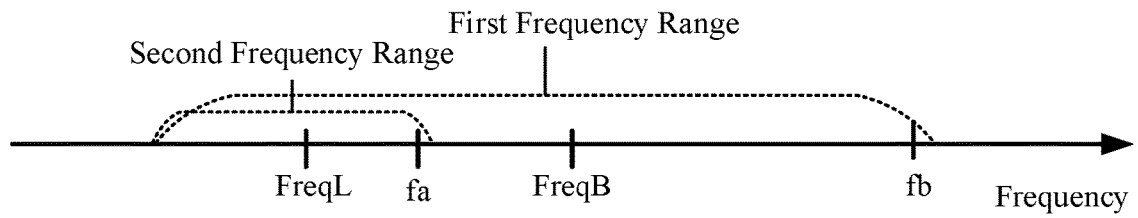
FIG. 2 illustrates an example of frequency ranges for operating two different processors according to one embodiment.

FIG. 2 illustrates an example of the respective operating frequency ranges of ProcB 110 and ProcL 120 according to one embodiment. The term "operating frequency" refers to the frequency at which a processor operates. In this embodiment, each ProcB 110 is configured to operate in a first frequency range, and each ProcL 120 is configured to operate in a second frequency range. The first frequency range and the second frequency range overlap, which means that ProcB 110 and ProcL 120 may operate at the same time at the same frequency without using an asynchronous bridge (such as the ADB-400) to communicate with the snoop control unit 130 and the memory 140. In the embodiment of FIG. 2, the first frequency range includes the entire second frequency range; furthermore, the first frequency range includes one or more frequencies that are higher than the maximum frequency of the second frequency range. Thus, ProcB 110 can operate at a frequency higher than the maximum frequency of ProcL 120. With respect to the minimum frequency, the minimum frequencies of the first frequency range and the second frequency range may be the same (e.g., 0 GHz or another frequency), or different from each other.

In one embodiment, ProcB 110 has a default operating frequency FreqB, and ProcL 120 has a default operating frequency FreqL, where FreqB>FreqL. For example, FreqB=2.0 GHz and FreqL=1.5 GHz. The portion of the first frequency range that extends above FreqB (e.g., frequency fb) may be used by ProcB 110 for high performance operation; similarly, the portion of the second frequency range that extends above FreqL (e.g., frequency fa) may be used by ProcL 120 for high performance operation. Further details regarding the high performance operations will be provided in connection with FIG. 4, where the dynamic voltage and frequency scaling (DVFS) is described.

As mentioned before, ProcB 110 may have a higher processing capability than ProcL 120 but consume more power than ProcL 120. Although ProcB 110 and ProcL 120 may both be included in a multiprocessor system to execute tasks with different performance requirements, they are different from the aforementioned B-type and L-type processors in that ProcB 110 and ProcL 120 are the same type of processors. This is because ProcB 110 and ProcL 120 not only implement the same ISA, but also have the same hardware structure; more specifically, ProcB 110 and ProcL 120 are generated according to the same register-transfer level (RTL) description. The main difference between ProcB 110 and ProcL 120 lies in the different standard cell libraries that are used to implement the same RTL design. Moreover, the placing and routing of the standard cells may be different between ProcB 110 and ProcL 120.

Figure 3:
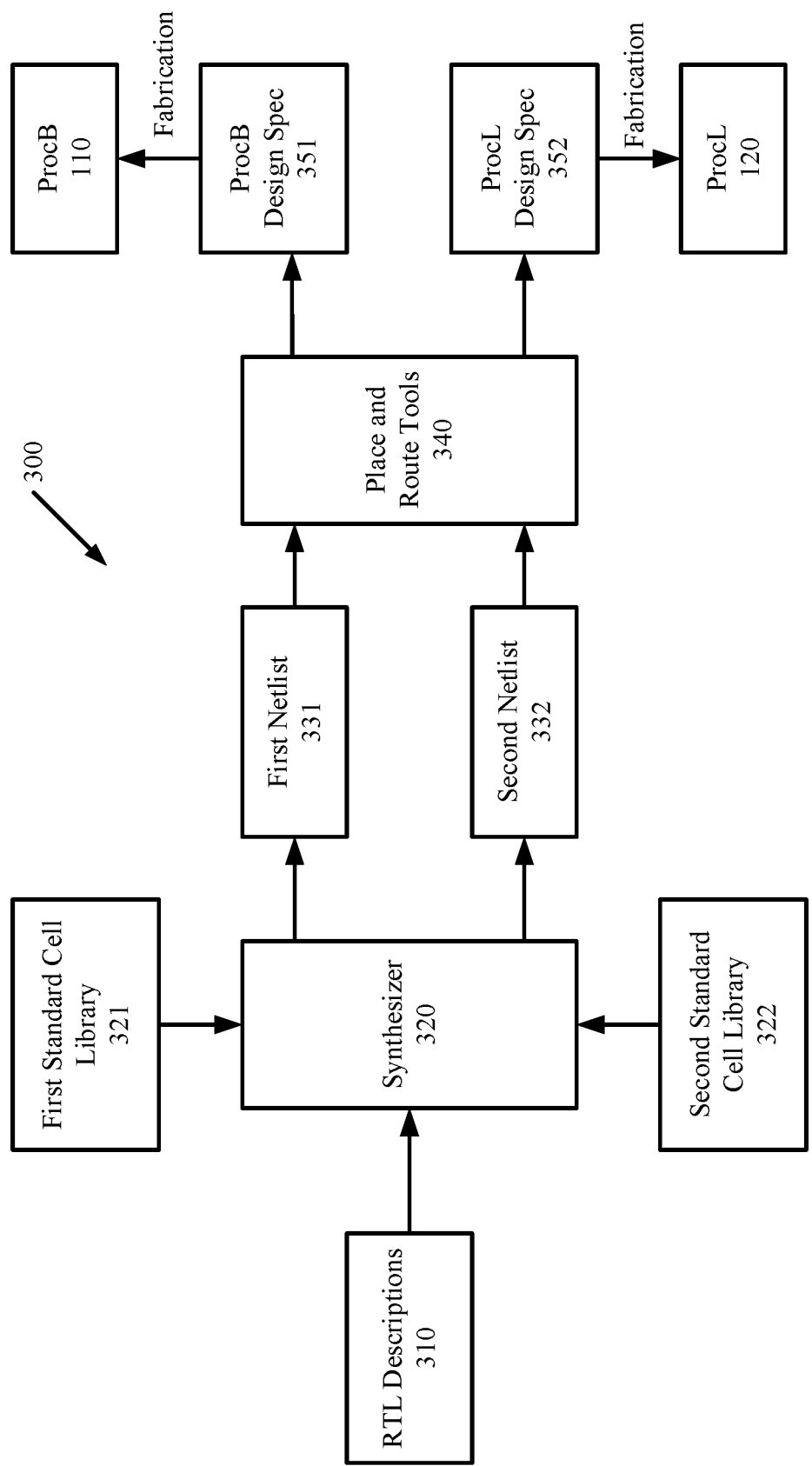
FIG. 3 illustrates a design process for two different processors according to one embodiment.

FIG. 3 illustrates a design process 300 for generating ProcB 110 and ProcL 120 according to one embodiment. The design process 300 explains the differences between ProcB 110 and ProcL 120. Starting from an RTL description 310, a synthesizer 320 synthesizes the RTL description 310 using a first standard cell library 321 to generate a first netlist 331. The synthesizer 320 further synthesizes the RTL description 310 using a second standard cell library 322 to generate a second netlist 332. The first and second netlists 331 and 332 describe the connectivity of the electronic circuits in ProcB 110 and ProcL 120, respectively. The first netlist 331 is processed by a set of place and route tools 340, which place the standard cells from the first standard cell library 321, and route the wiring among the standard cells to form a design specification 351 for ProcB 110. Similarly, the second netlist 332 is processed by the place and route tools 340, which place the standard cells from the second standard cell library 322, and route the wiring among the standard cells to form a design specification 352 for ProcL 120. In the integrated circuit fabrication process, ProcB 110 is fabricated according to the design specification 351 and ProcL 120 is fabricated according to the design specification 352.

In one embodiment, the first standard cell library 321 and the second standard cell library 322 offer two sets of standard cells that have the same functionality but different characteristics in terms of dynamic power consumption vs.

operating frequencies. More specifically, the cells in the first standard cell library 321 may consume more power and deliver more processing capabilities than the cells in the second standard cell library 322. Therefore, even though ProcB 110 and ProcL 120 have the same functionality and the same hardware structure at the RTL level, the performance and power consumption of ProcB 110 and ProcL 120 may be different from each other.

Figure 4:
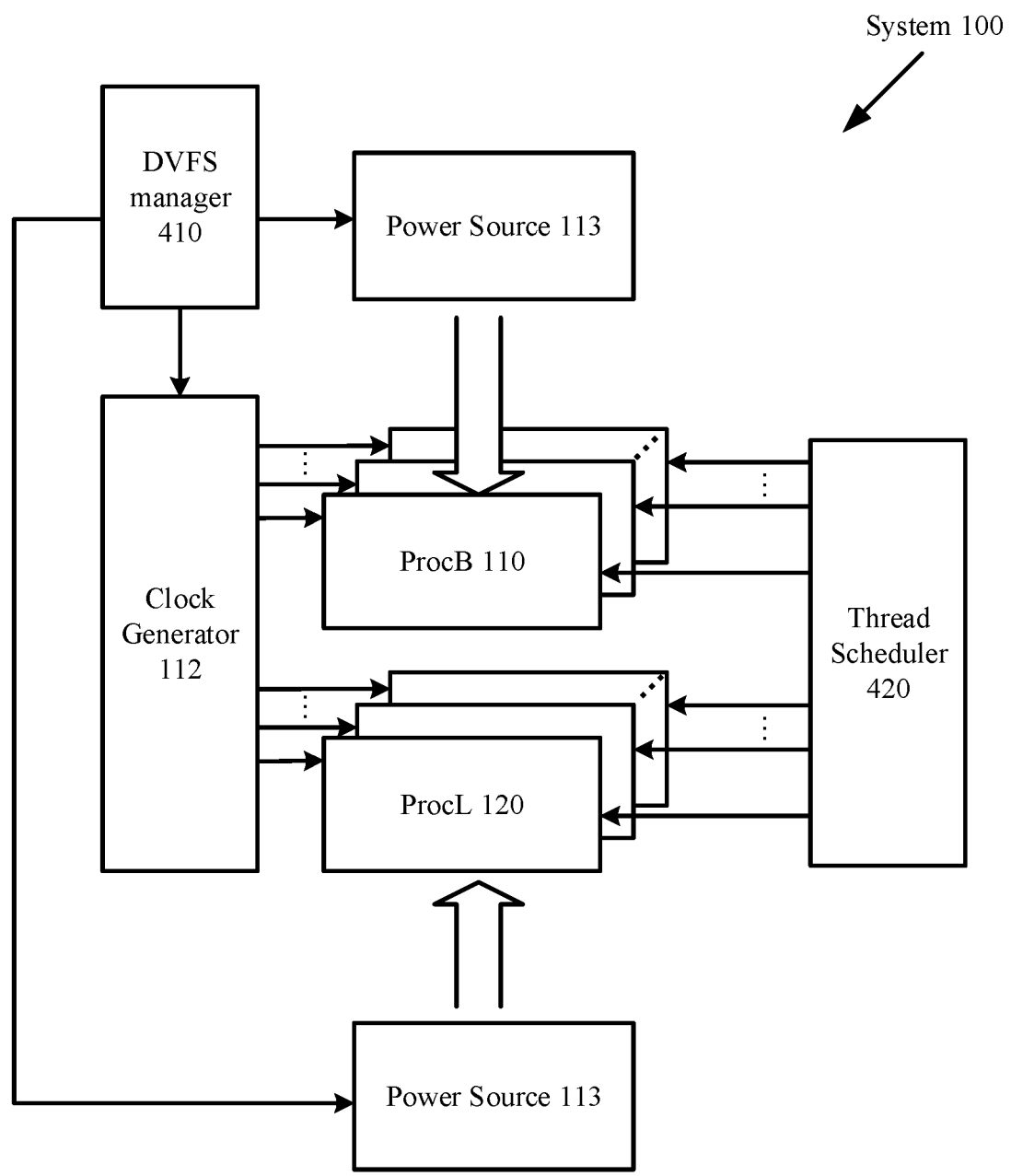
FIG. 4 illustrates a system which includes a DVFS manager and a thread scheduler according to one embodiment.

FIG. 4 illustrates the system 100 including a DVFS manager 410 according to one embodiment. The DVFS manager 410 determines the operating frequency and voltage levels for the processors ProcB 110 and ProcL 120 based on performance requirements (e.g., workload). When the performance requirement on the system 100 increases (e.g., workload increases), the DVFS manager 410 may increase the operating frequency of the enabled processor or processors in the system 100. Conversely, when the performance requirement on the system 100 decreases (e.g., workload decreases), the DVFS manager 410 may decrease the operating frequency of the enabled processor or processors in the system 100. As used herein, a processor is enabled when it is powered on (i.e., turned on). In alternative embodiments, a processor is enabled when it is powered on and is in a state ready for receiving assigned tasks. In one embodiment, the DVFS manager 410 may signal the clock generator 112 to adjust the operating frequency of the processors. Referring also to FIG. 2, the DVFS manager 410 may adjust the operating frequency of the processors within the second frequency range if the enabled processors include at least one ProcL 120. The DVFS manager 410 may adjust the operating frequency of the processors within the first frequency range if the enabled processors include only one or more ProcBs 110 and no ProcL 120.

It is noted that ProcB 110 and ProcL 120 are designed to be able to operate at the same frequency. Referring to FIG. 2, in one scenario when both ProcB 110 and ProcL 120 are enabled, ProcB 110 needs to operate in the second frequency range; i.e., at a frequency lower than its default frequency FreqB. This is true even when the DVFS manager 410 scales up the frequency of ProcL 120. More specifically, if both ProcB 110 and ProcL 120 are enabled and the DVFS manager 410 boosts the frequency of ProcL 120 to fa, ProcB 110 will also be operating at frequency fa, which is lower than its default frequency FreqB.

Referring again to FIG. 2, in one embodiment, both ProcB 110 and ProcL 120 may operate at their respective default frequencies FreqB and FreqL and at the same default voltage V1. In a first scenario where only one or more ProcBs 110 are enabled, the DVFS manager 410 may boost the performance of each ProcB 110 to operate at frequency fb and voltage V2 (where V2>V1). In a second scenario where at least one ProcL 120 is enabled, the DVFS manager 410 may boost the performance of ProcL 120 to operate at frequency fa and voltage V2. If, in the second scenario, both ProcB 110 and ProcL 120 are enabled and share the same power source, then both processors will receive the same higher voltage required by ProcL 120. That is, both ProcB 110 and ProcL 120 will operate at frequency fa and voltage V2, even though the lower voltage V1 suffices for ProcB 110 to operate at frequency fa. However, if in the second scenario ProcB 110 and ProcL 120 use independent power sources, then ProcB 110 may operate at frequency fa and voltage V1 to save power, and ProcL 120 may operate at frequency fa and voltage V2.

Additionally, the system 100 may include a thread scheduler 420 to schedule task threads to each processor. The thread scheduler 420 may determine which processor or processors to enable according to the amount of workload and the number of threads in the workload. Detailed operations of the thread scheduler 420 will be provided with reference to FIG. 5.

In one embodiment, each of the DVFS manager 410 and the thread scheduler 420 may be a kernel process executed by the processors 110 and 120. Alternatively, the DVFS manager 410 and/or the thread scheduler 420 may be implemented by a combination of hardware (e.g., circuitry, dedicated logic, programmable logic, microcode, etc.), software and/or firmware.

Figure 5:
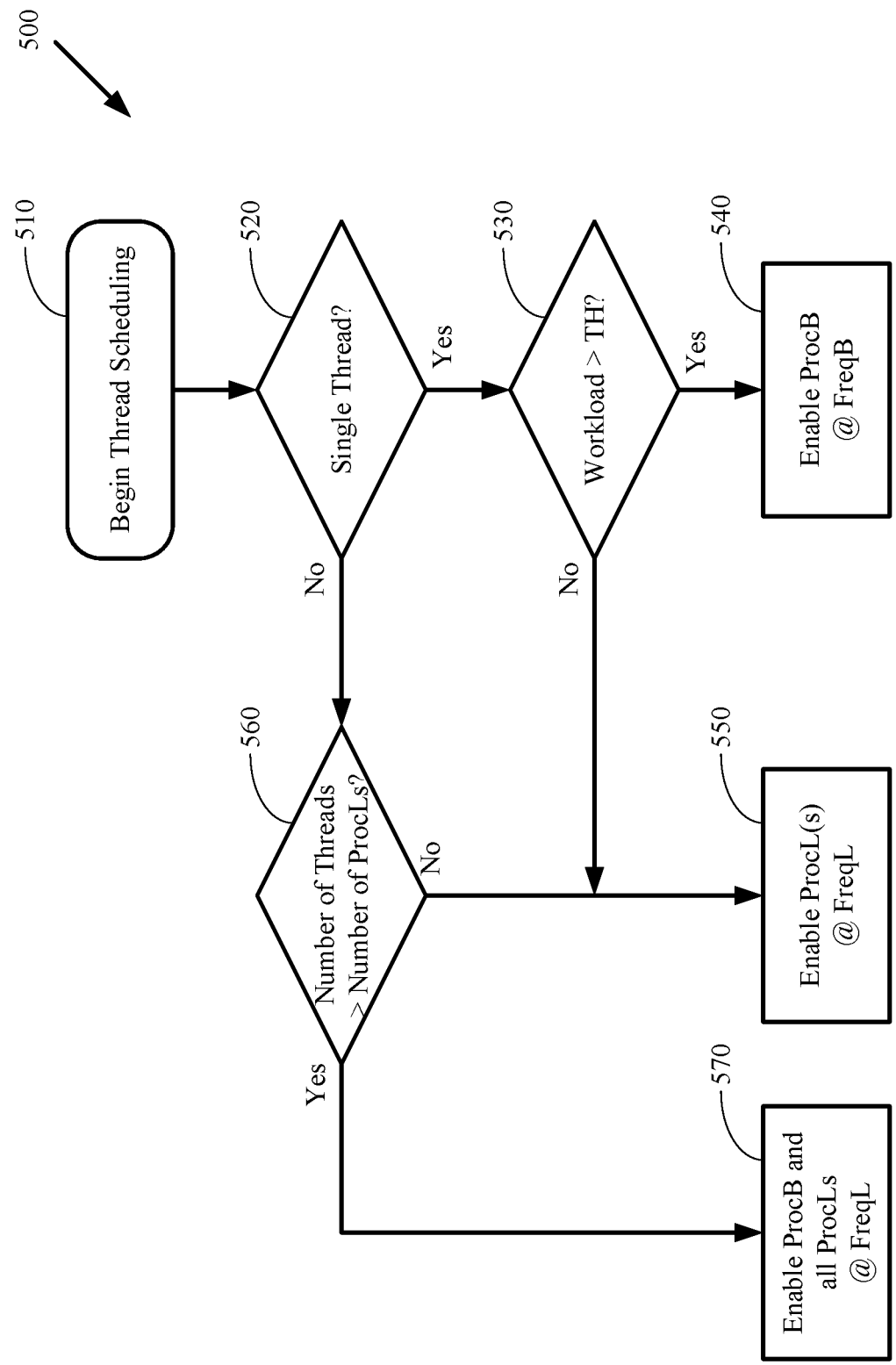
FIG. 5 is a flow diagram illustrating a method performed by a thread scheduler according to one embodiment.

FIG. 5 is a flow diagram illustrating a method 500 performed by the thread scheduler 420 according to one embodiment. In this embodiment, the thread scheduler 420 is in the system 100 that includes one ProcB 110 and multiple ProcLs 120. The method 500 begins (step 510) with the thread scheduler 420 determines whether the number of threads in the system is one (step 520); e.g., a single thread. If there is only a single thread, the thread scheduler 420 further determines whether the workload is greater than a threshold (TH) (step 530). If the workload is greater than TH (i.e., heavy workload), then the system 100 may enable ProcB 110 and the thread scheduler 420 may assign the thread to ProcB 110 with an operating frequency of FreqB (step 540). As described in connection with FIG. 2, FreqB is the default operating frequency for ProcB 110. If the workload is not greater than TH (i.e., light workload), then the system 100 may enable ProcL 120 and the thread scheduler 420 may assign the thread to ProcL 120 with an operating frequency of FreqL (step 550). As described in connection with FIG. 2, FreqL is the default operating frequency for ProcL 120.

If, at step 520, it is determined that there is more than one thread, the method 500 proceeds to compare the number of threads with the number of ProcLs 120 in the system (step 560). If the number of threads is no greater than the number of ProcLs 120, then the system 100 may enable one or more ProcLs 120 for processing the workload. For example, the system 100 may enable the number of ProcLs 120 equal to the number of threads, and the thread scheduler 420 may assign each thread to a ProcL 120 operating at the frequency FreqL (step 550). If the number of threads is greater than the number of ProcLs 120, then the system 100 may enable all of the processors ProcLs 120, and the thread scheduler 420 may assign the threads to the one ProcB 110 and all of the ProcLs 120, all of which may operate at the frequency FreqL (step 570).

In an alternative embodiment, the system may include multiple ProcBs 110 and multiple ProcLs 120, where the number of ProcBs 110 is denoted as Num_ProcB and the number of ProcLs 110 is denoted as Num_ProcL. If there are multiple threads in the system 100, and the number of threads Num_Thread is such that Num_Thread≤Num_ProcB and Num_Thread≤Num_ProcL, then the thread scheduler 420 may assign each thread to a ProcB 110 operating at the frequency FreqB if the workload is heavy (e.g., workload>TH), or each thread to a ProcL 120 operating at the frequency FreqL if the workload is light (e.g., workload≤TH). However, if Num_Thread>Num_ProcB and Num_Thread>Num_ProcL, the thread scheduler 420 may assign the threads to both ProcBs 110 and ProcLs 120, all of which operate at the frequency FreqL.

It is noted that method 500 is applicable to scenarios where DVFS is performed. Thus, in FIG. 5, the default frequency FreqB may be replaced by any frequency within the first frequency range (e.g., fb in FIG. 2), and FreqL may be replaced by any frequency within the second frequency range (e.g., fa in FIG. 2).

Figure 6:
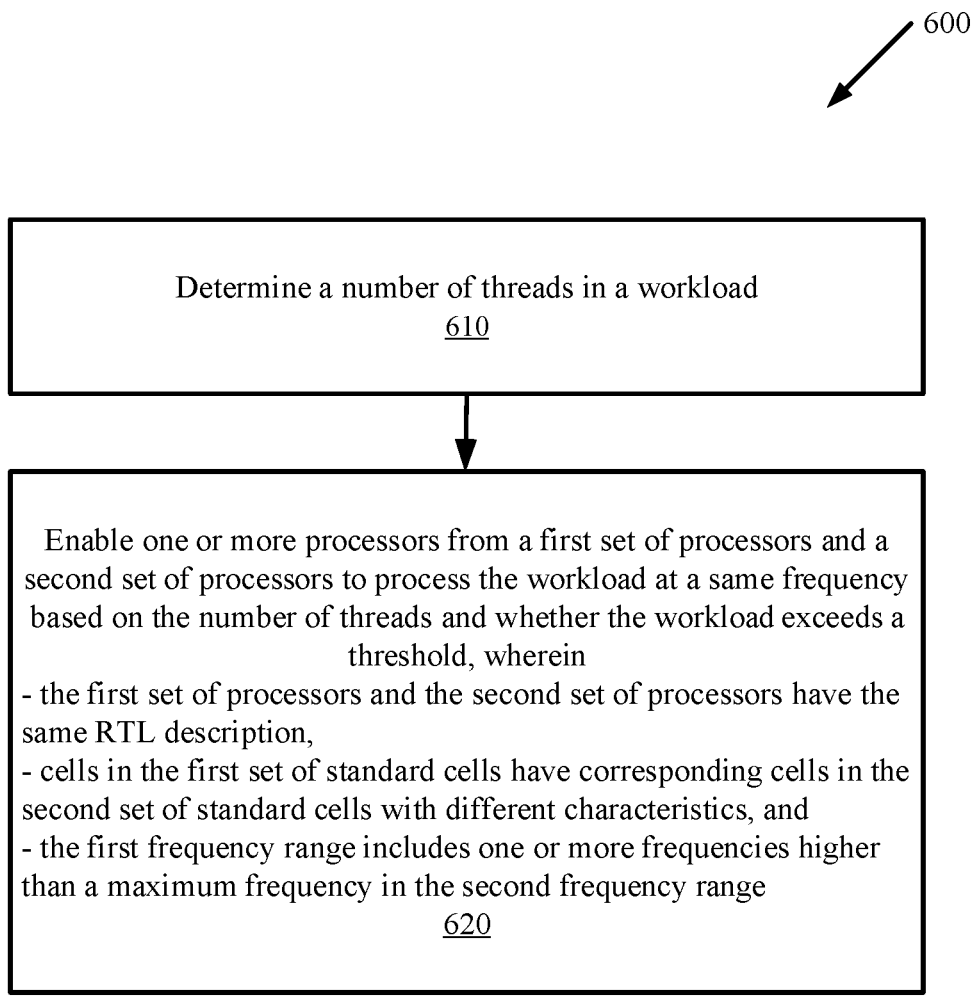
FIG. 6 is a flow diagram illustrating a method for a multiprocessor system to process a workload according to one embodiment.

FIG. 6 is a flow diagram illustrating a method 600 for a multiprocessor system to process a workload according to one embodiment. The method 600 may be performed by a multiprocessor system, such as the system 100 of FIG. 1. The method 600 begins with the system 100 determining a number of threads in the workload (step 610). Based on the number of threads and whether the workload exceeds a threshold, the system 100 enables one or more processors from a first set of processors and a second set of processors to process the workload at a same frequency (step 620). The first set of processors include a first set of standard cells and is configured to operate in a first frequency range; and a second set of processors include a second set of standard cells and is configured to operate in a second frequency range. The first set of processors and the second set of processors have the same RTL description. Cells in the first set of standard cells have corresponding cells in the second set of standard cells with different characteristics. Furthermore, the first frequency range includes one or more frequencies higher than a maximum frequency in the second frequency range.

In alternative embodiments, the methods 500 and 600 may be performed by hardware (e.g., circuitry, dedicated logic, programmable logic, microcode, etc.), software (e.g., instructions run on a processing device), firmware, or a combination thereof.

The operations of the flow diagrams of FIGS. 5 and 6 have been described with reference to the exemplary embodiments of FIGS. 1 and 4. However, it should be understood that the operations of the flow diagrams of FIGS. 5 and 6 can be performed by embodiments of the invention other than the embodiments discussed with reference to FIGS. 1 and 4, and the embodiments discussed with reference to FIGS. 1 and 4 can perform operations different than those discussed with reference to the flow diagrams. While the flow diagrams of FIGS. 5 and 6 show a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits, or general purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A multiprocessor system for processing a workload, comprising:
    a first set of processors, which include a first set of standard cells and are operable in a first frequency range;
    a second set of processors, which include a second set of standard cells and are operable in a second frequency range, wherein the first set of processors and the second set of processors have a same register-transfer level (RTL) description, cells in the first set of standard cells have corresponding cells in the second set of standard cells with different characteristics, and the first frequency range includes one or more frequencies higher than a maximum frequency in the second frequency range; and
    a clock generator operable to provide a same frequency to the first set of processors and the second set of processors.

2. The system of claim 1, wherein the first set of standard cells and the second set of standard cells are different at least in terms of dynamic power consumption versus frequency.

3. The system of claim 1, wherein placement and routing of respective standard cells are different between the first set of processors and the second set of processors.

4. The system of claim 1, wherein the first set of processors and the second set of processors are operable at a same voltage when at least one processor in the first set of processors and at least one processor in the second set of processors are enabled.

5. The system of claim 1, wherein the first set of processors and the second set of processors are operable at different voltages when at least one processor in the first set of processors and at least one processor in the second set of processors are enabled.

6. The system of claim 1, wherein, in response to a determination that the workload is no greater than a threshold and the number of threads in the workload is no greater than the number of processors in the second set of processors, the system is operative to enable one or more processors in the second set of processors for processing the workload.

7. The system of claim 6, wherein, in response to an increase of the workload, each of the enabled one or more processors in the second set of processors increases an operating frequency within the second frequency range.

8. The system of claim 1, wherein, in response to a determination that the workload is greater than a threshold and the number of threads in the workload is no greater than the number of processors in the first set of processors, the system is operative to enable one or more processors in the first set of processors for processing the workload.

9. The system of claim 8, wherein, in response to an increase of the workload, each of the enabled one or more processors in the first set of processors increases an operating frequency within the first frequency range.

10. The system of claim 1, wherein the first set of processors and the second set of processors are operable at the same frequency when at least one processor in the first set of processors and at least one processor in the second set of processors are enabled.

11. A method for processing a workload by a multiprocessor system, comprising:
    determining a number of threads in the workload; and
    enabling one or more processors from a first set of processors and a second set of processors to process the workload at a same frequency based on the number of threads and whether the workload exceeds a threshold, wherein the first set of processors include a first set of standard cells and is configured to operate in a first frequency range; and
    the second set of processors include a second set of standard cells and is configured to operate in a second frequency range, wherein the first set of processors and the second set of processors have a same register-transfer level (RTL) description, cells in the first set of standard cells have corresponding cells in the second set of standard cells with different characteristics, and the first frequency range includes one or more frequencies higher than a maximum frequency in the second frequency range.

12. The method of claim 11, wherein the first set of standard cells and the second set of standard cells are different at least in terms of dynamic power consumption versus frequency.

13. The method of claim 11, wherein placement and routing of respective standard cells are different between the first set of processors and the second set of processors.

14. The method of claim 11, wherein the first set of processors and the second set of processors are configured to operate at a same voltage when at least one processor in the first set of processors and at least one processor in the second set of processors are enabled.

15. The method of claim 11, wherein the first set of processors and the second set of processors are configured to operate at different voltages when at least one processor in the first set of processors and at least one processor in the second set of processors are enabled.

16. The method of claim 11, wherein, in response to a determination that the workload is no greater than a threshold and the number of threads in the workload is no greater than the number of processors in the second set of processors, the method further comprising: enabling one or more processors in the second set of processors for processing the workload.

17. The method of claim 16, wherein, in response to an increase of the workload, the method further comprising: increasing an operating frequency within the second frequency range for each of the enabled one or more processors in the second set of processors.

18. The method of claim 11, wherein, in response to a determination that the workload is greater than a threshold and the number of threads in the workload is no greater than the number of processors in the first set of processors, the method further comprising: enabling one or more processors in the first set of processors for processing the workload.

19. The method of claim 18, wherein, in response to an increase of the workload, the method further comprising: increasing an operating frequency within the first frequency range for each of the enabled one or more processors in the first set of processors.

20. The method of claim 11, wherein the first set of processors and the second set of processors are configured to operate at the same frequency when at least one processor in the first set of processors and at least one processor in the second set of processors are enabled.

* * * * *